United States Patent
Duraiswamy et al.

(10) Patent No.: US 8,491,679 B2
(45) Date of Patent: *Jul. 23, 2013

(54) HYDROGEN GENERATION UTILIZING INTEGRATED CO2 REMOVAL WITH STEAM REFORMING

(75) Inventors: Kandaswamy Duraiswamy, Huntington Beach, CA (US); Anand S. Chellappa, Albuquerque, NM (US)

(73) Assignee: Intelligent Energy, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/516,185

(22) PCT Filed: Dec. 14, 2010

(86) PCT No.: PCT/US2010/060356
§ 371 (c)(1),
(2), (4) Date: Jul. 31, 2012

(87) PCT Pub. No.: WO2011/075490
PCT Pub. Date: Jun. 23, 2011

(65) Prior Publication Data
US 2013/0034785 A1    Feb. 7, 2013

Related U.S. Application Data

(60) Provisional application No. 61/288,082, filed on Dec. 18, 2009, provisional application No. 61/286,329, filed on Dec. 14, 2009.

(51) Int. Cl.
*B01J 8/00* (2006.01)
*B01J 7/00* (2006.01)
*C01B 3/36* (2006.01)

(52) U.S. Cl.
USPC .............. 48/61; 48/197 R; 422/625; 422/629

(58) Field of Classification Search
USPC .... 61/61, 197 R; 422/129, 625–629; 423/644
See application file for complete search history.

(56) References Cited

U.S. PATENT DOCUMENTS

| | | | |
|---|---|---|---|
| 4,378,336 A * | 3/1983 | Yoon | 422/201 |
| 4,568,583 A | 2/1986 | Twigg | |
| 4,861,347 A | 8/1989 | Szydlowski | |
| 5,639,431 A * | 6/1997 | Shirasaki et al. | 422/212 |
| 7,041,272 B2 | 5/2006 | Keeper | |
| 2002/0142208 A1 | 10/2002 | Keeper | |
| 2007/0151152 A1 | 7/2007 | Mukai et al. | |
| 2012/0156574 A1* | 6/2012 | Kandaswamy et al. | 429/410 |

* cited by examiner

*Primary Examiner* — Matthew Merkling
(74) *Attorney, Agent, or Firm* — Baker Hostetler, LLP; Mark H. Krietzman

(57) ABSTRACT

A steam reformer may comprise fluid inlet and outlet connections and have a substantially cylindrical geometry divided into reforming segments and reforming compartments extending longitudinally within the reformer, each being in fluid communication. With the fluid inlets and outlets. Further, methods for generating hydrogen may comprise steam reformation and material adsorption in one operation followed by regeneration of adsorbers in another operation. Cathode off-gas from a fuel cell may be used to regenerate and sweep the adsorbers, and the operations may cycle among a plurality of adsorption enhanced reformers to provide a continuous flow of hydrogen.

9 Claims, 14 Drawing Sheets

AER cycle

| Time step=> | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Bed 1 | P | P | P | P | P | P | E | E | R | R | R | R | R | R | R | R | R | R | R | R | R | S | S | B |
| Bed 2 | R | R | R | S | S | B | P | P | P | P | P | P | E | E | R | R | R | R | R | R | R | R | R | R |
| Bed 3 | R | R | R | R | R | R | R | R | R | S | S | B | P | P | P | P | P | P | E | E | R | R | R | R |
| Bed 4 | E | E | R | R | R | R | R | R | R | R | R | R | R | R | R | S | S | B | P | P | P | P | P | P |

| Steps: | Symbol | seconds |
|---|---|---|
| H2 Production | P | 30 |
| Exhaust | E | 10 |
| Regeneration | R | 65 |
| Steam Clean | S | 10 |
| Back Fill | B | 5 |

Feed: Ethanol/water premix. CH4 or LPG and steam may also be used.
Depressurization step precede Exhaust step
Feed: Simulated COG (nitrogen & air mixture) combined with (steam in nitrogen carrier).
Feed: L.P Steam.
Feed: None. connected to H2 generating tube.

FIG. 6

Table 1.

|  | Test id # | 909293 | 911031 | 912011 | 912041 |
|---|---|---|---|---|---|
| Temp | deg C | 507 | 528 | 505 | 503 |
| CH4 Feed | lit/min | 0.54 | 0.62 | 0.51 | 0.70 |
| Water Feed | mol/min | 0.108 | 0.114 | 0.081 | 0.10 |
| Steam/C | mol ratio | 4.5 | 4.1 | 3.6 | 3.1 |
| H2 product flow | lit/min | 2.01 | 2.3 | 1.98 | 2.66 |
| Product Gas composition |  |  |  |  |  |
| H2 | % | 98.2% | 98.% | 99.2% | 98.7% |
| CH4 | % | 1.8% | 2.% | 0.8% | 1.3% |
| CO | ppm | 31 | 610 | 12 | 16 |
| CO2 | ppm | 363 | 3750 | 2310 | 985 |
| CH4 conversion | % | 93.3% | 92.5% | 96.8% | 94.9% |

FIG. 13

Table 2.

|  | Test id # | 909293 | 911031 | 912011 | 912041 |
|---|---|---|---|---|---|
| Temp | deg C | 507 | 528 | 505 | 503 |
| CH4 Feed | lit/min | 0.54 | 0.62 | 0.51 | 0.70 |
| Water Feed | mol/min | 0.108 | 0.114 | 0.081 | 0.10 |
| Steam/C | mol ratio | 4.5 | 4.1 | 3.6 | 3.1 |
| H2 product flow | lit/min | 2.01 | 2.3 | 1.98 | 2.66 |
| Product Gas composition |  |  |  |  |  |
| H2 | % | 98.2% | 98.% | 99.2% | 98.7% |
| CH4 | % | 1.8% | 2.% | 0.8% | 1.3% |
| CO | ppm | 31 | 610 | 12 | 16 |
| CO2 | ppm | 363 | 3750 | 2310 | 985 |
| CH4 conversion | % | 93.3% | 92.5% | 96.8% | 94.9% |

FIG. 14

HYDROGEN GENERATION UTILIZING INTEGRATED CO2 REMOVAL WITH STEAM REFORMING

RELATED APPLICATION

This application claims the full Paris Convention benefit of and priority to U.S. Provisional Patent Application Ser. No. 61/286,329, filed Dec. 14, 2009, and U.S. Provisional Patent Application Ser. No. 61/288,082, filed Dec. 18, 2009, the contents of which are incorporated by reference herein in its entirety, as if fully set forth herein.

STATEMENT REGARDING FEDERALLY SPONSORED RESEARCH OR DEVELOPMENT

The invention was partly made with Government support under Contract No. DE-FG36-07GO17013 by the Department of Energy, and the United States Government may have certain rights in the invention.

BACKGROUND

This disclosure relates to steam reformers that integrates the step of $CO_2$ removal with hydrogen production and methods for producing hydrogen in a continuous manner.

GENERAL BACKGROUND

Steam reformation is a combination of thermo chemical processes that converts a fuel steam mixture into a hydrogen rich gas mixture typically composed of hydrogen ($H_2$), carbon monoxide (CO), carbon dioxide ($CO_2$), methane ($CH_4$), water vapor ($H_2O$) and other gases depending on the composition of the fuel feedstock. Typically this mixture is known as reformate. For many applications, including many fuel cell applications, this reformate stream is then passed to a hydrogen purification unit in which 60% to 90% of the hydrogen is separated into a relatively pure hydrogen stream (99+% $H_2$), and an off gas stream consisting of the other components in the reformate mixture.

The most typical reformer used in industry is a steam reformer, but other reformers can also include oxygen in the feed, and are known as auto-thermal reformers and partial oxidation reformers. Steam reformation is typically conducted in the presence of a catalysts such as nickel based catalysts, a combination of nickel and precious metal catalysts or a combination of precious metal catalysts. These reformers are integrated with other upstream and downstream process units and reactors such as steam generation and water gas shift reactors to create a fuel processing system, and when integrated with hydrogen purification units yield a hydrogen generation system.

In applications such as fuel cell systems and hydrogen refueling stations, the thermal efficiency of the steam reformer is considered by many to be one of the critical elements to overall system economics. The thermal efficiency is typically defined as the ratio of the heating value of the product (reformate) from the reformer to that of the feed streams into the reformer. In the case of a hydrogen generation system, the thermal efficiency of the system is typically defined as the ratio of the heating value of the hydrogen produced to that of the feed streams into the system. Some traditional hydrogen generation systems have reported thermal efficiencies of 60-70%. Some believe that commercialization of hydrogen generation systems particularly for small scale fuel cell systems (<100 kWe) and hydrogen refueling stations (<100 kg/day) would be more likely if the systems had thermal efficiencies >75% and more preferably >80%.

Many believe that more rapid commercialization of a hydrogen infrastructure will benefit if the quest to achieve high purity hydrogen from a reformer without using large amounts of palladium or platinum alloys which result in material in membranes high capital costs.

Removing $CO_2$ selectively during steam reformation in a cyclic manner sometimes referred to as (SER) or sorbent saturation are not known to produce hydrogen of purity that is typically >90% at low temperature and low pressure.

SUMMARY OF THE DISCLOSURE

According to at least one aspect of one or more exemplary implementations, adsorption enhanced reforming is conducted in a rapid cycle pressure swing reformer that consists of thermally integrated multiple reforming tubes or reforming segments that switch between reforming ($CO_2$ saturation), regeneration and certain intermediate steps using suitable sequencing means. The reformer tubes contain adsorbent and catalyst materials that may be admixed or packed as composite materials.

According to at least one aspect of one or more exemplary implementations, when the adsorption enhanced reformer is integrated into a fuel cell power system, the exhaust from the cathode end of the fuel cell is used for regenerating the adsorbent in a pressure swing fashion. By the use of the cathode effluent from the fuel cell that contains ~18-20% steam for CO2 purge during regeneration, the steam requirement is reduced yielding higher hydrogen generation system efficiencies.

According to at least one aspect of one or more exemplary implementations redox (reduction-oxidation) materials are added to the catalyst to supply the endothermic heat required for adsorption enhanced steam reforming.

In some exemplary implementations fuel cell quality hydrogen is produced via integrating $CO_2$ adsorption with steam reformation.

In some exemplary implementations the enhanced reformer can produce fuel cell quality hydrogen (>90% hydrogen) and at >90% fuel conversions while operating both reforming and regeneration steps at about 400 to about 550° C., preferably at about 400 to about 500° C., and at 1-70 bar, preferably at about 1 to about 10 bar, and more preferably at about 1 to about 5 bar. Reforming at these conditions should enable lower capital costs and thermal efficiencies (ratio of heating value of hydrogen produced to the heating value of all feed, LHV basis) >about 70% and more preferably >about 80%.

Other features and advantages of the present disclosure will be set forth, in part, in the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure.

DRAWINGS

FIG. 1A illustrates a semi sectional view of a 4-segment exemplary adsorption enhanced reformer FIG. 1B illustrates a cross sectional top view of one segment in a 4-segment exemplary adsorption enhanced reformer FIG. 2 illustrates a cross sectional top view of a 4-segment exemplary adsorption enhanced reformer FIG. 3 illustrates a top view of the top end plate of an exemplary adsorption enhanced reformer FIG. 4 illustrates a top view of the bottom end plate of an exemplary adsorption enhanced reformer FIG. 5 illustrates a side view of an exemplary adsorption enhanced reformer.

FIG. 6. shows an exemplary representation of the distinct states during operation of an enhanced adsorption reformer.

FIG. 13 shows Table 1 which illustrates performance data from a 4-tube AER hydrogen generation system.

FIG. 14 shows Table 2 which illustrates performance data from a 4-tube AER hydrogen generation system.

Figure 1A:
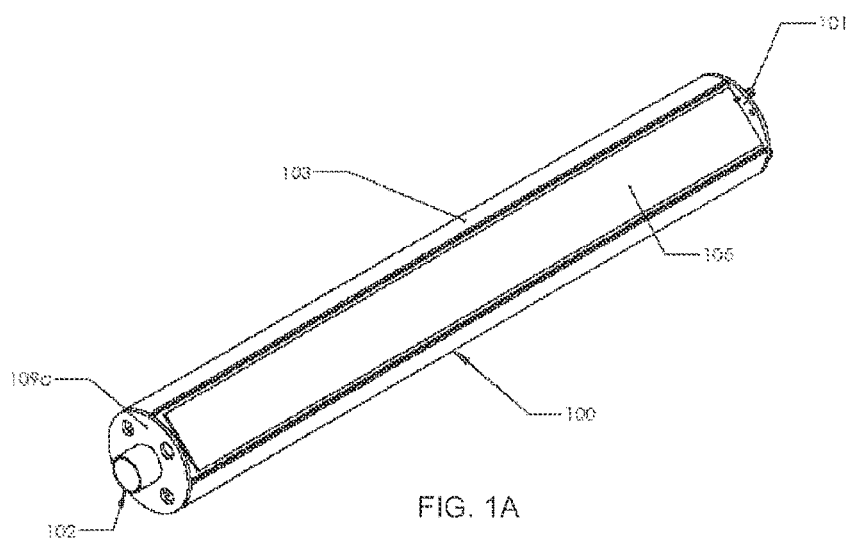
Figure 1B:
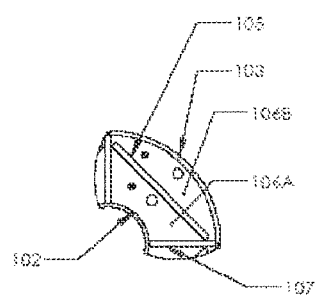

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

Figure 2A:
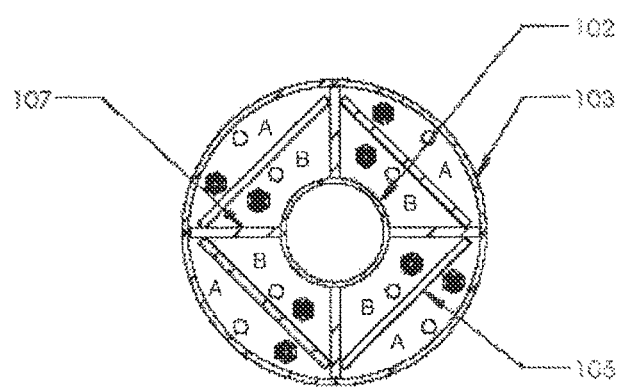
Figure 2B:
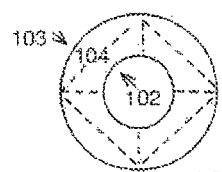
Figure 2C:
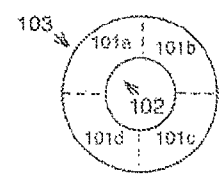

FIGS. 2A, 2B, and 2C show a representation of an exemplary implementation of an adsorption enhanced reformer (AER) 100 that contains four reformer segments 101A-101O formed by partition plates or segmenting plates 107. The use of four segment is not a limitation and a lesser or greater number may be used depending on the intended usage, input and outputs. The enhanced reformer is shown as having a concentric pipe configuration. Inner pipe 102 and outer pipe or shell 103. For example, the annular space between outer shell and inner shell 102 forms a reaction chamber 104 that is segmented into four sections 101 with divider plates 105. The illustration of the pipes as being circular in cross section is not a limitation other cross sectional shape including geometric and folded or channeled (to increase surface area) are within the scope of the disclosure. Additional pipes or portions of pipes or tubes may be added around or inside the inner or outer pipe/shell depending on the intended usage and such multi-layered structures are within the scope of this disclosure.

The reaction chambers 107 are packed with sorbent and catalyst. Segment partition plates 107 are first welded to the inner pipe 102 and the divider plates 105 are welded to the segment plates. Laser-cut quarter sections of the outer shell are welded to the segment and divider plates. The use of the divider plates splits each reformer segment 101 into two chambers or compartments 106a and 106b. Welding is one methodology to construct the chambers and partitions. Those of ordinary skill in the art will recognize that other fabrication methods are possible and within the scope of this disclosure.

Figure 9:
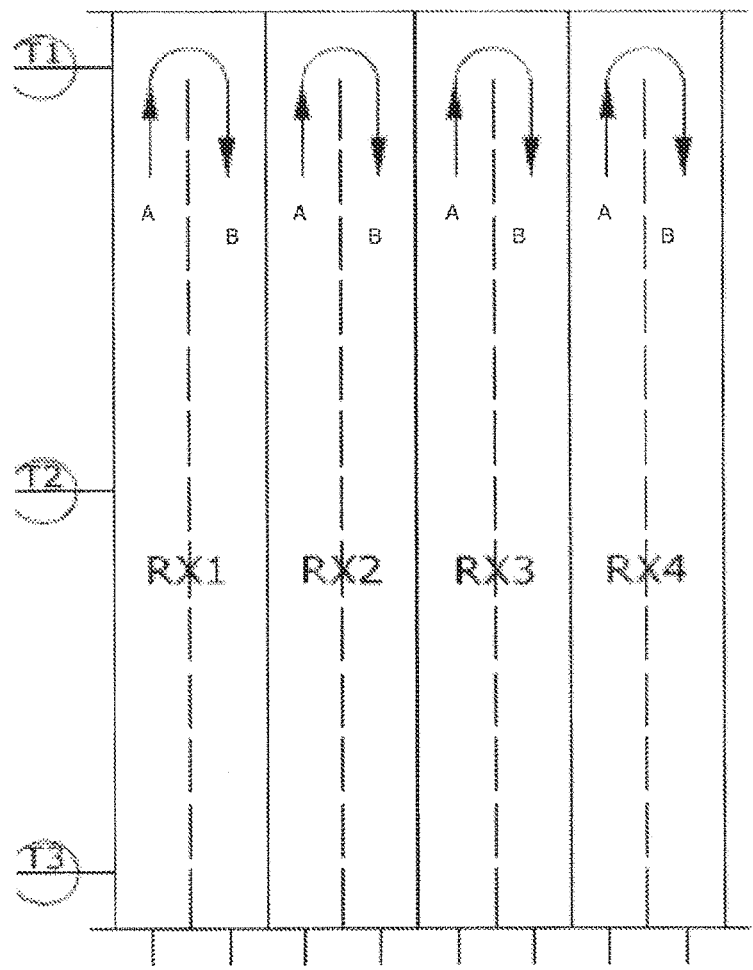
FIG. 9 illustrates the "U" tube flow arrangement when the adsorption enhanced reformer is in the form of segments.

The 8-compartments formed by portioning provide four sets of up and down flow paths shown in FIG. 2 as the "A" and "B" channels in each. The flow paths form of an U-shape in each segment. An overview of the flow paths in each reactor is also shown in FIG. 9 wherein the two chambers formed in each region have fluid communication at one end via the "U" shape.

The U-shaped flow path allows for heat transfer between incoming and outgoing gases and subsequently to higher thermal efficiencies. The cooling of the outgoing product hot gases by the incoming feed gases permits not only heat recovery but also low temperature operation of the valves and the conduits handling the fluids. The segment partition plates 107 and the divider plates 105 provide surfaces that also serve the purpose of heat transfer. Preferably the surface area of the partition and divider plates can be further increased, by stamping or other fabrication techniques, to yield a surface that is essentially corrugated in nature. Features such as channels can also be added, by machining or other fabrication techniques, to the surfaces of the partition and divider plates. Catalyst coating and adsorbent coating on these plates may also be done. Monolithic shaped structures such as honey combs can be placed in the reaction channels instead of pellets or extrudates.

Alternately the segment plates 107 and the divider plates 105 can have some level of curvature, indentations, groves, edges or radii instead of being planar.

Figure 3:
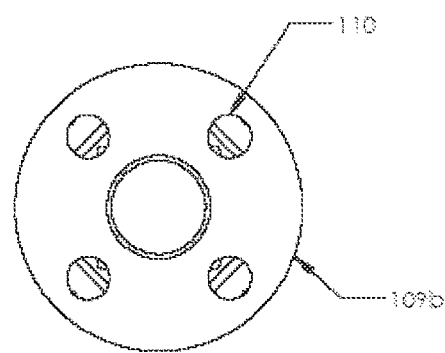

Each segment 101 is made gas tight by welding the inner pipe 102 and the outer shell 103 to the end plates (109 and 114). The divider plate 105 is welded only to one of the end plates 109 (FIG. 3; shown as top end plate) allowing for the gases (reaction mixture) to make a U-turn. The length of the divider plate 105 is made shorter by ~1" than the partition plate 107 to allow for a gap for the gases (reaction mixture) to make a U-turn between the segment passages 106a and 106b. Catalyst and sorbent is loaded into the four segments from the top through 1" ports 110 of end plate 109 that are plugged after catalyst loading is completed. The call out of an about one inch gap is not a limitation, the gap needs to be of sufficient to allow the appropriate flow of gases.

Figure 4:
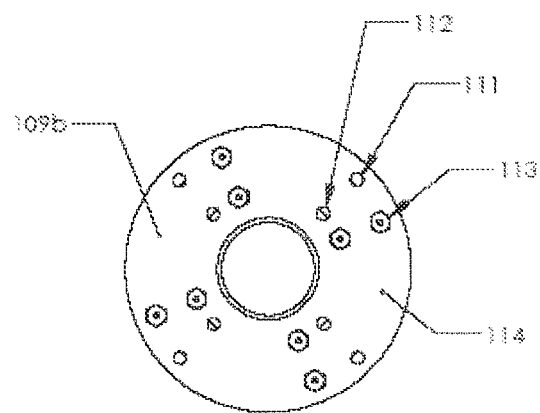
Figure 5:
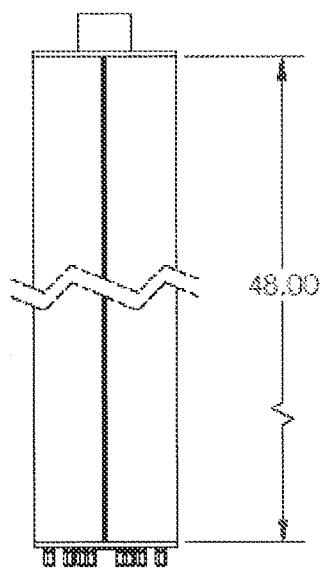

Each segment contains a set of fluid inlet 111 and fluid outlet 112 connections and thermocouples ports 113 at the bottom end plate 114 as shown in FIG. 4. The length of the shell 103 is 48" (FIG. 5) for this exemplary illustration and the materials of construction is stainless steel 304.

The adsorption enhanced reformer with four segments is described as an example only. In practice, any number of segments or reactor tubes can be used depending upon factors that include, but are not limited to, the desired production rate of hydrogen, the hydrogen purity, and the type of fuel.

The reformer being a hydrogen generation system producing hydrogen with a purity of about 85-99%, with the remainder primarily being $CH_4$ and $CO_2$ and with trace levels (ppm) of CO. When this produced hydrogen is fed to the anode of a PEM fuel cell, the anode side may have to be purged in a periodic or continuous fashion to remove these impurities. The anode purge gas can be combusted either in a catalytic combustor or in burner to produce a flue gas primarily comprising of $CO_2$, $H_2O$, $N_2$ and $O_2$. The inner shell and outer shell walls allow for external heat transfer from this flue gas produced and the fuel gas from the reformer collected before the beginning of regeneration step.

An exemplary implementation of the states during operation of an enhanced adsorption reformer is shown in FIG. 6. The time steps represent hydrogen production (P, includes steam reformation and adsorbent saturation) from each tube. Time steps for this particular example is 5 seconds each, and each tube produces hydrogen for 6 steps or 30 seconds, before going into the steps of depressurization or exhaust (E), regeneration (R), steam clean-up (S) and back-fill steps (B, include pressurization). The total number of steps that comprise exhaust, regeneration, steam clean-up and backfill steps equal to 18 steps or 90 seconds for this exemplary illustration. Thus the total cycle time is 2 minutes or 120 seconds.

When attached to or integrated with a PEM fuel cell, the cathode off-gas can be used as the sweep gas to regenerate the adsorbent materials. The use of cathode off gas (~18-20% steam, balance $N_2$ and $O_2$) as a sweep gas is preferable to the use of pre-heated vitiated air. Vitiated air is the product of combustion of some amount of the fuel to the reformer such as natural gas or of anode purge gas. Vitiated air would contain some amount of $CO_2$ and thus, the removal of $CO_2$ from the sorbent would be negatively affected due to equilibrium limitation with the $CO_2$ contained in the sweep gas. The use of cathode off-gas also eliminates the need to produce steam for regeneration of the adsorbent bed and thereby higher thermal efficiencies can be achieved.

Alternately, air can be fed to a small pressure swing adsorber (for example, a pressure swing adsorber sold by SeQual Technologies in San Diego, Calif.) to provide a nitrogen rich, oxygen lean gas stream for use as the sweep gas in the adsorption enhanced reformer.

Inlet 111 and outlet 112 connections of each segment 101 are on the same end (or end plate 114) of the reformer thus enabling heat transfer between the reformer feed and reformer product streams. Each section has three adjoining walls with other sections to provide heat exchange. The examples of sweep gas identified for use in the exemplary reformer described here is essentially free of hydrogen.

Figure 7:
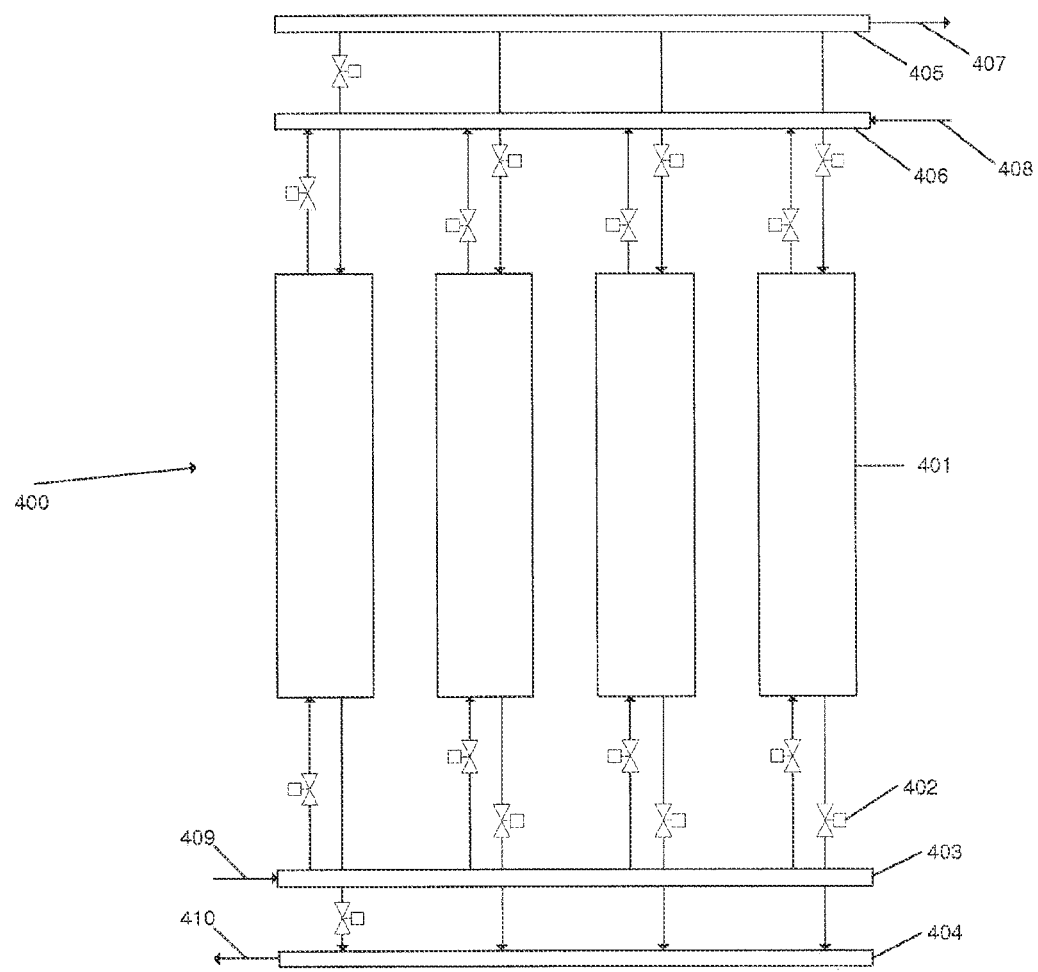
FIG. 7 shows a schematic diagram of a hydrogen generation system that contains the adsorption enhanced reformer composed of four tubes FIG. 8 describes the various operating regions in an exemplary 2-tube adsorption enhanced reformer.

FIG. 7 is an exemplary process flow diagram indicating some aspects of the use of an adsorption enhanced reformer in a hydrogen generation system 400. The reactors 401 shown in FIG. 7 represent reformer segments 101. The reactant fed 409 is routed into the reactors 401 through a feed manifold 403. The product gas 408 which predominantly consists of hydrogen (>90% hydrogen) is collected in the product manifold 406 and is then removed. When one reactor is fed with reactants 409 (methane and steam, for example) and is producing $H_2$ while simultaneously adsorbing $CO_2$ in the catalyst/sorbent bed, the other three reactors are undergoing desorption steps as described in FIG. 6. Sweep gas 407 is routed into the reactors through the manifold 405, and is then collected in manifold 404 and vented out as vent gas 410. Cyclic operation in this exemplary hydrogen generation system is achieved by the use of computer controlled solenoid valves 402.

The adsorption enhanced reformer is operated at temperatures of 400° C. to 550° C. The endothermic heat of reforming using methane or natural gas as an example is about 200 kJ/mol that is typically supplied by a combination of combustion of the feed fuel or another supplemental fuel and recuperation of heat between hot and cold streams. In a preferred aspect, the endothermic heat of reforming is generated by the use of a redox material such as ceria ($Ce_2O_3$ to $CeO_2$). Oxidation (during regeneration) is effected using the cathode exhaust gas that contains water, oxygen and nitrogen (when the reformer is operated in conjunction with a fuel cell) or from the combustion of the anode purge gas (equation 2). The material is then reduced back during the reforming step (equation 1). An exemplary reforming catalyst is a bimetallic precious metal catalyst (e.g. Rh—Pt) supported on ceria/$ZrO_2$ or other oxide supports. The catalyst and adsorbent containing ceria could also be incorporated in one composite pellet or particle. The following equations show the heat effects of the reforming reaction and heat generation during sorbent regeneration:

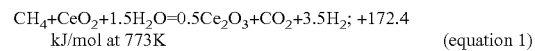

$$CH_4+CeO_2+1.5H_2O=0.5Ce_2O_3+CO_2+3.5H_2; +172.4 \text{ kJ/mol at 773K} \quad \text{(equation 1)}$$

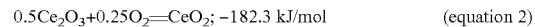

$$0.5Ce_2O_3+0.25O_2=CeO_2; -182.3 \text{ kJ/mol} \quad \text{(equation 2)}$$

As can be seen, the exothermic heat of oxidation (182.3 kJ/mol) exceeds the endothermic heat required for reforming (172.4 kJ/mol) thereby leading to a self sustaining reaction. Subsequently, the requirement of heat by combustion of a fuel is minimized or eliminated leading to a process of enhanced thermal efficiency. Efficiencies of 70-85% can be realized. In this analysis, the heat of $CO_2$ adsorption by the sorbent (−21 kJ/mol) and heat required for desorption (+21 kJ/mol) are not shown, as these cancel each other.

If these heat effects are included, then the defining reactions can be represented as follows:

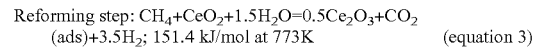

$$\text{Reforming step: } CH_4+CeO_2+1.5H_2O=0.5Ce_2O_3+CO_2\text{(ads)}+3.5H_2; 151.4 \text{ kJ/mol at 773K} \quad \text{(equation 3)}$$

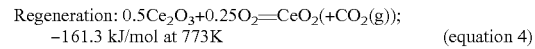

$$\text{Regeneration: } 0.5Ce_2O_3+0.25O_2=CeO_2(+CO_2(g)); -161.3 \text{ kJ/mol at 773K} \quad \text{(equation 4)}$$

In this instance also, the heat generated during regeneration is exploited to support and sustain the reforming step (equation 4). Exemplary adsorbent material are hydrotalcite, and hydrotalcite that is doped with components such as potassium and/or gallium as supplied for example by SASOL GmbH.

In another aspect of the hydrogen generation system, cyclic operation of the adsorption enhanced reformer is realized by using a rotary valve to switch between the tubes or sections of the adsorption enhanced reformer. The adsorption enhanced reformer employs multi-tube or multi-segment, multi-function reactors packaged into a single process vessel thus conserving space. The reformer achieves proper timing and process feed management by predetermined operation of the rotary valves.

In general, each tube or segment of the reformer is packed with adsorbent, and catalyst materials designed to achieve a specific function during the cycle. Conceptually the tube has several functional regions. As the reactor tubes or segments are folded into U-shape or inverted U-shape, the midpoint of the reactor will be at the desired temperature, and the feed end and the product end will be cooler, by exchanging heat between the incoming feed and outgoing product gases.

Figure 8:
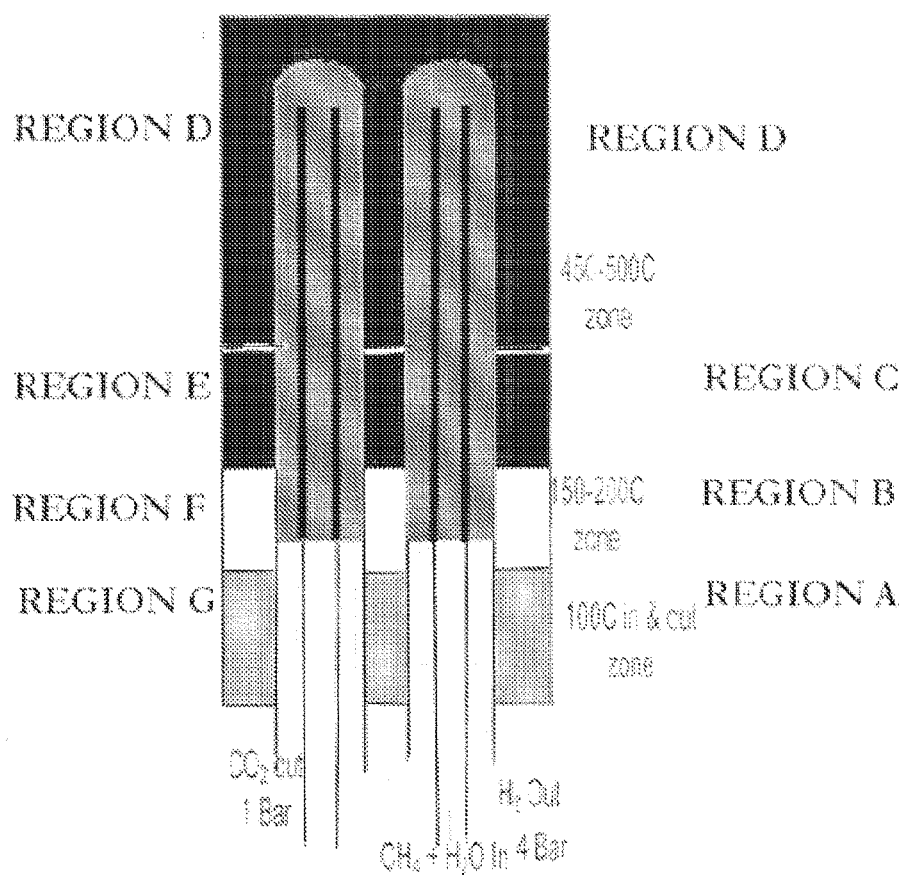

FIG. 8, provides a system overview starting from the feed/exhaust end and proceeding to the product end of the tube the regions are as follows:

Region A at the inlet provides for thermal energy recuperation. In this region, water and fuel preheating and water vaporization are realized; the feed passes in an annular passage under pressurized operation, and the reaction product flows through the central gas passage. During regeneration at ambient pressure, the sweep gas flows through the central passage and exits through the annual passage.

Region B provides steam superheating and fuel vaporization functions

Region C provides thermal energy recuperation and superheat functions;

Region D is the central high temp region where reforming and regeneration are carried out cyclically. At the end of the U-tube, reforming gases turn and travel downward through the center tube in pressurized operation; during ambient pressure regeneration, the regeneration gases with desorbed $CO_2$ turnaround and flow in the annular space. Region D may include a pre-reforming catalyst, a mixed material bed with reforming catalyst and CO₂ adsorbent, and in some instances, a sulfur adsorbent bed, and catalytic combustion materials. The hottest section is located at the top of an inverted "U" bend. Here the reforming (endothermic), shift reaction and CO₂ sorption reaction (both are exothermic) at 1-10 bar takes place at about 400-550° C. as shown in equation (5)

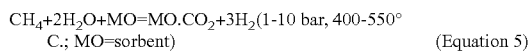
$$CH_4+2H_2O+MO=MO.CO_2+3H_2 (1-10\ bar,\ 400-550°\ C.;\ MO=sorbent) \quad (Equation\ 5)$$

Similarly, during the regeneration cycle, the heat of desorption which is 20 to 25 kJ/mol is provided via external heat transfer as in the H₂ production step, where the CO₂ is carried away with a purge gas (cathode off-gas—COG, from the fuel cell containing ~70% N2, ~20% H2O, 10% O2). The purge gas is introduced in the reverse flow direction so that the sorbent bed is regenerated quicker.

$$MO.CO_2+purge\ gas\text{-}COG=MO+CO_2+purge\ gas\text{-}COG \quad (equation\ 6)$$

Region E—provides thermal energy recuperation and preheat functions (similar to region C);

Region F—during the low-pressure regeneration cycle, water vapor is carried back by the flue gas towards Region B.

Region G—provides pressure swing adsorption materials in a packed center section. Other adsorbent materials such as sulfur adsorbents can also be packed in this region. The annular area should be available for sweep gas (e.g. air or steam containing gas) inlet under low-pressure regeneration cycle.

The relative length of each region will be dependant on the kinetics (rates) of chemical reactions as well as the sorption capacity of the absorbent. Those of ordinary skill in the art will understand this to mean that the diameter and length of the regions may be varied depending on such variables. By arranging the tubes or wedges in an "U" bend, the high temperature end is free to grow or expand, and the cooler feed end can be connected to rotary valves. In this manner, mechanical integrity can be realized leading to increased durability of the adsorption enhanced reformer and hydrogen generation system. The input and output streams may be managed by two or more separate rotary valves for (1) air and steam or N₂-inert gas purge, (2) fuel feed and for water feed, (3) for H₂ product and (4) for regeneration gas exhaust.

Ceria/Lanthanum oxide can be used as a H₂S adsorbent and can be cyclically regenerated with steam, heat and purge gas.

FIG. 9 illustrates the "U" tube arrangement when the adsorption enhanced reformer is in the form of segments wherein two chambers forming a region have fluid communication at one end. By pairing the regions C and E (not shown in FIG. 9, see FIG. 8) next to each other, B and F next to each other and finally A and G next to each other, heat transfer between each pair is maximized.

Figure 10:
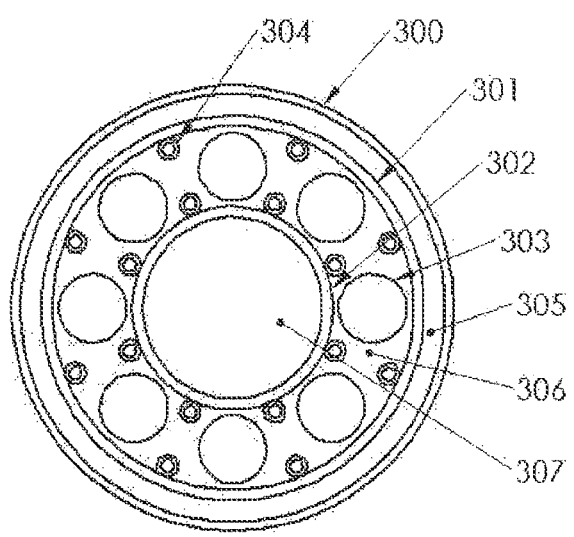
FIG. 10 shows a cross section of another aspect of an adsorption enhanced reformer with multiple reformer U-tubes.

FIG. 10 shows a cross section of another aspect of adsorption enhanced reformer that contains multiple reformer tubes 303. The tubes are situated in the concentric region between cylindrical shells 301 and 302. Heat recuperation and/or combustion of fuel can be conducted in the regions 306 and 307 and water can be vaporized in the region 305 that is bound between the shells 300 and 301. Sequencing of cyclic operation is preferably achieved using rotary valves.

Figure 11:
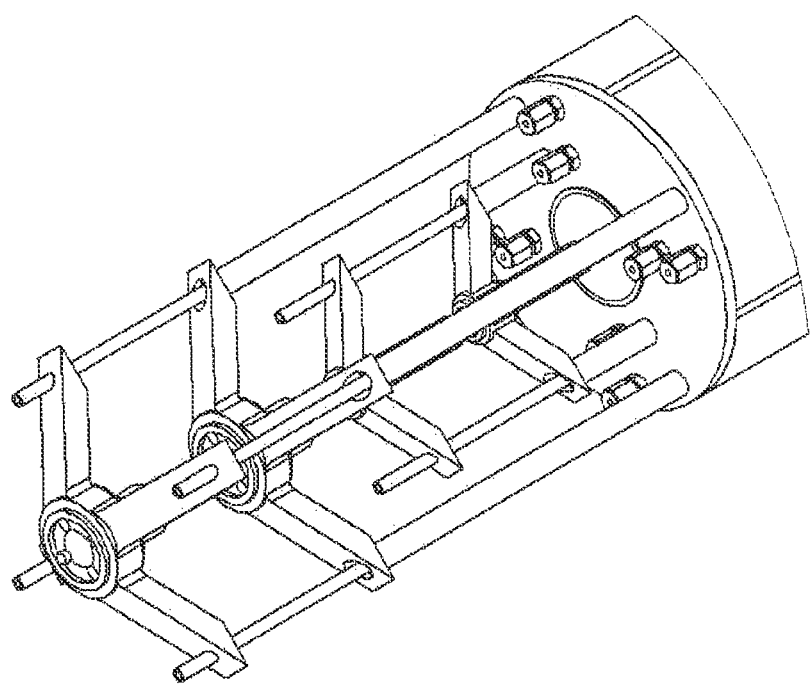
FIG. 11 shows an exemplary rapid cycle rotary valve that is situated at the bottom end of the reformer.

FIG. 11 shows a typical rapid cycle rotary valve that is situated at the bottom end of the reformer. This valve is used to switch between the reformer tubes in a predetermined sequence. Operation of an exemplary reformer would involve the following main steps.

Step 1—H₂ Production: In Step 1, natural gas (or ethanol) and water vapor is fed to tube 1 (FIG. 10) already at ~150° C. and between 1-5 bar. The mixture is heated to around 400-550° C. and H₂ is produced while simultaneously capturing CO₂ using the adsorbent. If the bed is not cycled at the appropriate time, the sorbent will reach saturation and CO₂ will start appearing in the product gas stream. Before this happens, the feed is stopped or switched to another tube at a specified time (~1-2 minutes) before CO₂ breakthrough occurs.

Step 2—Depressurization: In Step 2, tube 1 is depressurized, and the exiting gases are used in the catalytic combustor. Step 2 may be done in two or more sub-steps, during which the first half of depressurization, gases may be used to re-pressurize another tube, and then used second half of depressurization to produces fuel gas. After this, the tube is back-purged or in reverse direction as in step 1 with low pressure steam for a short duration (~5-15 seconds). The quantity of purge steam used is typically about two to three volumes of the tube itself.

Step 3—Sorbent Regeneration: In Step 3, tube 1 is back-purged with a sweep gas, for example, fuel cell cathode exhaust gas (containing steam, N₂ and some O₂) for a predetermined period (~1 minute) to remove desorbed CO₂; after desorption, the sweep gas is stopped and diverted to another tube. Low pressure steam is then introduced for purging out the cathode gas (N₂ and O₂) for about 7 seconds, or at quantities of roughly three to four volumes of the tube. The tube is then re-pressurized, initially with a depressurizing gas from another tube, and finally by back-filling with product H₂. Tube 1 is then ready for H2-production (step 1).

In another aspect of some exemplary implementations of enhanced reformers, the inner pipe is pre-formed with the partition plates and divider plates using methods such as investment casting to form an insert of the exemplary adsorption reformer. The insert is then fitted into the outer shell of the reformer to form leak tight reformer segment.

The catalyst and adsorbent is typically loaded with an adsorbent to catalyst (NC) weight ratio of 1:1 to 20:1. Different feed stocks may required different A/C ratios. For example, the ratio could be 1:1 to 4:1 in the case of natural gas or methane and up to 10:1 in the case of ethanol. While the catalyst and adsorbents are typically in particle form (tablets, pellets, granules) they may be incorporated into the reformer in different form. For example, the catalyst could be coated or loaded on substrates such as foams, felts, fibers or metal meshes made of ceramic or metals. Adsorbents could be in the form of particles and that are uniformly loaded on to a sized catalyst coated substrate that is pliable in nature. The substrate is then rolled to incorporate the adsorbent particles inside the layers of the roll. The roll is then inserted into the reformer segments 306. The adsorbent particles can also be incorporated between layers of catalyst coated substrates that are arranged in a stacked fashion in the reformer segments 306. The catalyst can also be coated on to the surfaces of the partition plates and divider plates of the reformer segments. The catalyst and adsorbent materials can also be pre-mixed and formed into composite particles.

Catalysts of different compositions can be arranged in a staged fashion along the length of the reformer segment to enhance the extent of different reactions such as reforming and water gas shift with a goal to maximize hydrogen generation. Methods for staging and using catalysts in a staged fashion is disclosed in U.S. application Ser. No. 10/599,813 filed Apr. 4, 2005, which is herein incorporated by reference in its entirety.

In another aspect of one or more exemplary implementations of adsorption enhanced reformers, the surfaces of the surfaces of the external pipe and internal pipe contain slots or grooves for positioning the partition plates to form the reformer segments. The metal joints can be sealed by nickel brazing or diffusion bonding. The surfaces of the partition plates and the divider plates can be modified to increase the surface area by corrugations or channels. Higher surface areas are beneficial from the standpoint of heat transfer catalyst loading when the catalyst is coated onto such surfaces.

Reformation of feeds stocks in the exemplary adsorption enhanced reformer can be conducted at thermal neutral conditions. This operation however requires that the feed stock is preheated or vaporized to some extent before feeding into the reformer. For example, another shell can be added external to the outer shell of the reformer to preheat and vaporize water required for reforming, or the feedstock when the feedstock is a mixture of alcohols and water. In addition or alternately, during start-up or as required during normal operation to provide supplemental heat, the reformer may be heated by catalytic or non catalytic combustion of the feedstock or other suitable fuels in areas such as the hollow area bounded by the surface of the inner pipe that is opposite to the other surface that is attached to the divider plates and partition plates.

EXAMPLES

Example 1

In a 4-tube AER hydrogen generation system (FIG. 7), the reformer tubes were packed with 600 grams 5 mm×5 mm cylindrical pellets of potassium promoted hydrotalcite (Pural MG-70 from Sasol Alumina) and 60 gm of Sud-Chemie reforming catalyst (FCS HC-14). Several tests were conducted using methane feed; $H_2$ was continuously produced from one of the four reactors (2" O.D.×24" tall) while the other three reactors were undergoing regeneration and recharging events. A PLC controller was used for valve switching between tubes and different gas streams. Approximately 10 slpm equivalent of regeneration gas (simulated cathode off gas) was used for sweeping (removing) the desorbing $CO_2$. Heat was supplied to the reformer tubes by placing them in an electric furnace equipped with a temperature controller. A summary of test results is shown in Tables 1 & 2.

In the above tests, reforming was conducted at 5 psig pressure (1.34 bar). As shown in Table 1, fuel cell quality hydrogen with purity 98 to 99.2% was produced, while integrating $CO_2$ adsorption with steam reformation in one step; the adsorbed $CO_2$ was rejected during the adsorbent regeneration step. While regeneration was done using simulated cathode off gas during this test, a mixture of air and steam or nitrogen and steam can also be used. The sweep gas can be chosen depending upon the nature of the fuel cell application and the availability of purge or sweep gas streams.

CO can be eliminated by using a simple methanation reactor prior to feeding the produced hydrogen to the PEM fuel cell.

Example 2

In another test, ethanol reforming was conducted in an adsorption enhanced reformer at a steam to carbon ratio of 3, 1.34 bar and 500-550° C. In a 4-tube AER hydrogen generation system (FIG. 7), the reformer tubes were packed with 600 grams 5 mm×5 mm cylindrical pellets of potassium promoted hydrotalcite (Pural MG-70 from Sasol Alumina) and 60 gm of Sud-Chemie reforming catalyst (FCS HC-14). Approximately 10 slpm equivalent of regeneration gas (simulated cathode off gas) was used for sweeping (removing) the desorbing $CO_2$. Heat was supplied to the reformer tubes by placing them in an electric furnace equipped with a temperature controller.

Figure 12:
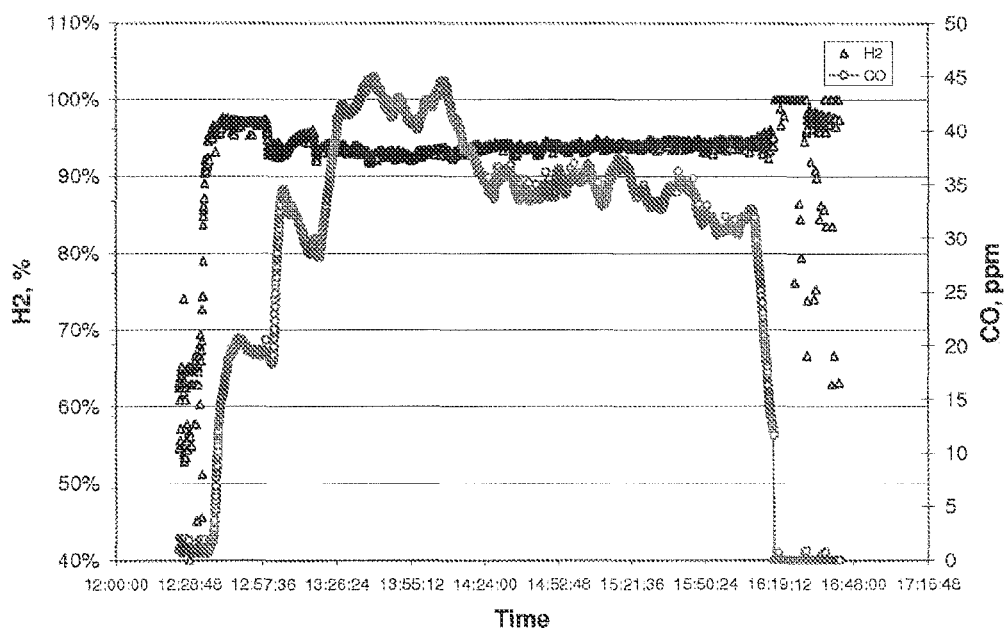
FIG. 12 shows quality of hydrogen produced during ethanol reforming in an exemplary adsorption enhanced reformer.

As shown in FIG. 12, fuel cell quality hydrogen with purity 93 to 97% was produced, with CO levels at <45 ppm (Also see Tables 1 & 2). CO can be eliminated by using a simple methanation reactor prior to feeding the produced hydrogen to the PEM fuel cell.

While the use of ethanol/water and methane have described in the aforementioned examples, other hydrocarbon fuels, alcohol/water mixtures and alcohol can also be used.

While the method and agent have been described in terms of what are presently considered to be the most practical and preferred implementations, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the implementation, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting, such statements are expressly not to be considered as made by the applicant(s).

In this regard it should be understood that for practical reasons and so as to avoid adding potentially hundreds of claims, the applicant has presented claims with initial dependencies only. We are presenting only one claim?

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternatives.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

All callouts associated with figures are hereby incorporated by this reference.

Since certain changes may be made in the above apparatus without departing from the scope of the invention herein involved, it is intended that all matter contained in the above description, as shown in the accompanying drawing, shall be interpreted in an illustrative, and not a limiting sense.

We claim:

1. A steam reformer comprising:
    a plurality of fluid inlet connections;
    a plurality of fluid outlet connections;
    a plurality of reforming segments formed by dividing an annular space with a plurality of segmenting plates extending between an outer surface of an inner cylindrical shell and an inner surface of an outer cylindrical shell and extending longitudinally within the annular space;
    a plurality of reforming compartments formed by splitting each of said reforming segments with a divider plate, with fluid communication between the plurality of reforming compartments of each reforming segment provided at a first end thereof;
    a top end plate to seal the first end of said inner and outer shells;
    a bottom end plate to seal a second end of said inner and outer shells and comprising said fluid inlet and outlet connections;
    wherein each of said reforming segments contains one or more of each of a reforming catalyst and a carbon dioxide adsorbent in a predetermined amount and composition to reform inlet fluids into outlet fluids comprising hydrogen.

2. The steam reformer of claim 1, wherein a cathode off-gas line of a fuel cell is connected to the fluid inlet connections.

3. The steam reformer of claim 1, wherein an anode off-gas line of a fuel cell is connected to the fluid inlet connections.

4. The steam reformer of claim 1, further comprising a feed manifold connecting a reactant feed to the plurality of fluid inlet connections.

5. The steam reformer of claim 1, further comprising a product manifold connecting a product feed to the plurality of fluid outlet connections.

6. The steam reformer of claim 1, wherein the divider plates extend longitudinally within the reforming segments.

7. The steam reformer of claim 1, wherein the annular space is in a heat exchange relationship with a space outside the outer cylindrical shell.

8. The steam reformer of claim 1, wherein the reforming segments are in a heat exchange relationship via the segmenting plates.

9. The steam reformer of claim 1, wherein the reforming compartments are in a heat exchange relationship via the divider plates.

* * * * *